J. E. REED.

Improvement in Cultivators.

No. 115,771.

Patented June 6, 1871.

Witnesses,
Jas. O. Hutchinson

Inventor,
J. Eugene Reed.

UNITED STATES PATENT OFFICE.

J. EUGENE REED, OF MINEVILLE, NEW YORK.

IMPROVEMENT IN CULTIVATORS.

Specification forming part of Letters Patent No. 115,771, dated June 6, 1871.

*To all whom it may concern:*

Be it known that I, J. EUGENE REED, of Mineville, in the county of Essex and in the State of New York, have invented certain new and useful Improvements in Cultivator; and do hereby declare that the following is a full, clear, and exact description thereof, reference being had to the accompanying drawing and to the letters of reference marked thereon making a part of this specification.

The nature of my invention consists in the construction and arrangement of a draft device for agricultural implements, as will be hereinafter more fully set forth.

In order to enable others skilled in the art to which my invention appertains to make and use the same, I will now proceed to describe its construction and operation, referring to the annexed drawing, in which—

Figure 1:
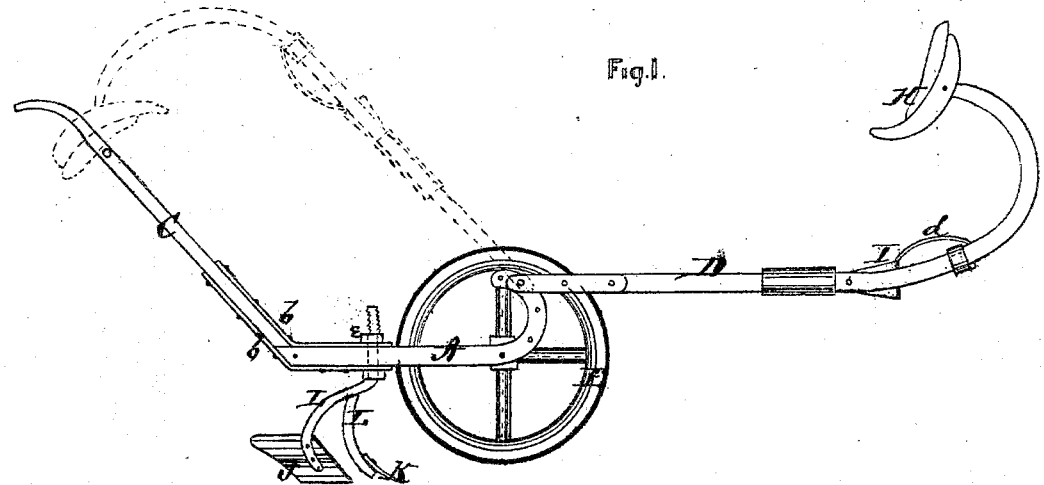
Figure 2:
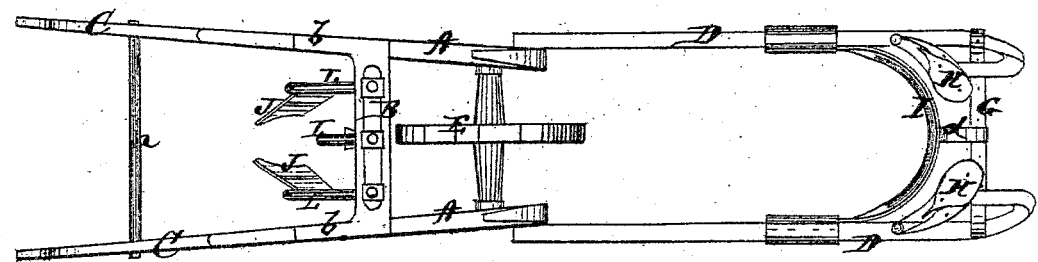
Figure 3:
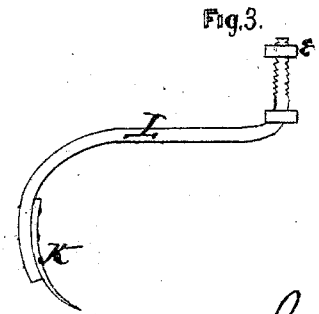

Figure 1 is a side elevation, and Fig. 2 a plan view, of my cultivator. Fig. 3 is a side view of a shovel-plow used in the same.

A A represent two side pieces connected by a slotted cross-bar, B, and having the handles C C attached at their rear ends, said handles being also at a suitable point connected by a round, *a*. The points of connection between each side piece A and its handle C, as well as with the cross-bar B, are on both the upper and lower sides strengthened by metallic braces *b b*. A suitable distance in front of the cross-bar B, and in the side pieces A A, the axle or journals of a wheel, E, has its bearings, as shown in Fig. 2. The front ends of the side pieces A A are curved, as shown in Fig. 1, and provided with a series of holes for the pivoting of a shaft, D, to each side piece. These shafts are connected near their front ends by a cross-bar, G, and their front ends are curved upward and backward, and upon the extreme ends are attached curved breast-pads H H, as shown. In rear of the cross-bar G, to the two shafts, is attached a draft-strap, I, which is also, by a short strap, *d*, connected with the cross-bar G. One man is to be in the shafts and one at the handles. The shafts being attached to the curved fore ends of the side pieces so as to raise on the handles, the power necessary to hold them down helps to propel the machine forward. The breast-pads press against the breast and shoulders, the small ends going partially under the arms. The draft-strap strikes at the union of the legs with the body. The hands grasp the shafts in rear of the body. The plows J J or shovels K K are fastened to curved arms L L, of different lengths, and these arms are all attached, by means of a single nut, *e*, on each, to the slotted cross-bar B, so that they may be readily changed to cut wide or narrow. They may be used as shown in the drawing—that is, two plows, with one shovel ahead turning dirt all in, or plows reversed, and one shovel on a long arm (shown in Fig. 3) behind to turn out; also, various other changes.

This cultivator may also be used as a horse machine by substituting horse-shafts for the shafts D D.

The frame may be constructed in various other ways, which all, however, retain the principal features, as above described. For instance, I may use cast side pieces, cast cross-bar, and wooden handles bolted on; or the side pieces and handles may be bent in one piece and cast cross-bar bolted on. This latter mode would probably be the most preferable; but I do not desire to confine myself to either, as one may be used as well as the other.

Having thus fully described my invention, what I claim as new, and desire to secure by Letters Patent, is—

In combination with the curved and perforated beams A A and wheel E, the pivoted shafts D D with breast-plates H H, strap I, bar G, and strap *d*, all constructed substantially as and for the purposes set forth.

In testimony that I claim the foregoing I have hereunto set my hand this 6th day of March, 1871.

J. EUGENE REED.

Witnesses:
BOVETT B. BISHOP,
MARCUS P. SMITH.